(12) United States Patent
Batchu et al.

(10) Patent No.: US 9,131,432 B2
(45) Date of Patent: Sep. 8, 2015

(54) METHOD AND APPARATUS FOR EFFICIENT AND DYNAMIC SYSTEM RESELECTION PROCEDURE FOR M2M STATIONARY DEVICES

(71) Applicant: QUALCOMM Incorporated, San Diego, CA (US)

(72) Inventors: Bhaskara V. Batchu, Hyderabad (IN); Sharad Shahi, Rajasthan (IN); Anand Rajurkar, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 353 days.

(21) Appl. No.: 13/759,657

(22) Filed: Feb. 5, 2013

(65) Prior Publication Data

US 2014/0221031 A1     Aug. 7, 2014

(51) Int. Cl.
*H04W 48/20*     (2009.01)

(52) U.S. Cl.
CPC ............... *H04W 48/20* (2013.01); *Y02B 60/50* (2013.01)

(58) Field of Classification Search
CPC .............................. H04W 48/20; H04W 48/18
USPC ........ 455/502, 452.1, 509, 450, 452.2, 67.11, 455/525; 370/338, 328, 229
See application file for complete search history.

(56) References Cited

U.S. PATENT DOCUMENTS

| 7,120,134 | B2 | 10/2006 | Tiedemann, Jr. et al. |
| 7,911,966 | B2 | 3/2011 | Yoo et al. |
| 2001/0011011 | A1* | 8/2001 | Kosugi ............................ 455/69 |
| 2002/0154610 | A1* | 10/2002 | Tiedemann et al. .......... 370/329 |
| 2005/0113100 | A1* | 5/2005 | Oprescu-Surcobe et al. 455/450 |
| 2005/0135320 | A1 | 6/2005 | Tiedemann, Jr. et al. |
| 2011/0199898 | A1 | 8/2011 | Cho et al. |
| 2012/0254890 | A1 | 10/2012 | Li et al. |
| 2012/0281580 | A1 | 11/2012 | Lee et al. |

* cited by examiner

*Primary Examiner* — John J Lee
(74) *Attorney, Agent, or Firm* — Arent Fox LLP

(57) ABSTRACT

Apparatus and method for wireless communication in a wireless communication network include receiving a synchronization channel message parameter at a user equipment (UE) from a network entity. The aspects also include transmitting data to the network entity based on the synchronization channel message parameter. Additionally, the aspects include determining whether an assignment of a reverse supplemental (RS) channel to the UE is performed by the network entity. Still further, the aspects include incrementing a counter value when the network entity fails to assign the RS channel. The aspects also include selecting another network entity when the counter value reaches a predetermined threshold. Other aspects, embodiments, and features are also claimed and described.

25 Claims, 12 Drawing Sheets

METHOD AND APPARATUS FOR EFFICIENT AND DYNAMIC SYSTEM RESELECTION PROCEDURE FOR M2M STATIONARY DEVICES

TECHNICAL FIELD

Aspects of the present disclosure relate generally to wireless communication systems, and more particularly, to an apparatus and method for efficient system selection for transmitting vast amount of data from a mobile device to a network.

BACKGROUND

Certain categories of mobile to mobile (M2M) devices require vast amount of data to be transmitted from one mobile device to a network (NW). In the absence of a Reverse Supplemental (RS) channel assignment from a NW, a mobile device may continue to transmit the data on reverse fundicated traffic channel for longer duration then needed, causing transmission delay and traffic stagnation.

For stationary M2M devices, a base station (BS) system selection is performed once with existing system selection algorithms. Afterwards, the mobile device always tries to acquire the same BS system. If a mobile devices latches to a BS system which doesn't assign the RS channel to the mobile device (e.g., BS doesn't support RS channel or the BS currently overloaded), the mobile device would be unable to transmit the data on a RS channel. Consequently, this would be very ineffective when the mobile device needs to transmit large amount of data to the NW.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present invention enable and provide efficient system selection for transmitting vast amount of data from a mobile device to a network thereby producing significant power savings. For example, some embodiments include a method of transmitting vast amount of data from a mobile device to a network is offered. The method includes receiving a synchronization channel message parameter at a user equipment (UE) from a network entity. The method also includes transmitting data to the network entity based on the synchronization channel message parameter. Additionally, the method includes determining whether an assignment of a RS channel to the UE is performed by the network entity. Still further, the method includes incrementing a counter value when the network entity fails to assign the RS channel. The method also includes selecting another network entity when the counter value reaches a predetermined threshold.

In another aspect, an apparatus of transmitting vast amount of data from a mobile device to a network is offered that includes a processor configured to receive a synchronization channel message parameter at a UE from a network entity. The processor is also configured to transmit data to the network entity based on the synchronization channel message parameter. Additionally, the processor is configured to determine whether an assignment of a RS channel to the UE is performed by the network entity. Still further, the processor is configured to increment a counter value when the network entity fails to assign the RS channel. The processor is also configured to select another network entity when the counter value reaches a predetermined threshold.

Additionally, in another aspect, an apparatus of transmitting vast amount of data from a mobile device to a network is offered that includes means for receiving an synchronization channel message parameter at a UE from a network entity. The apparatus includes means for transmitting data to the network entity based on the synchronization channel message parameter. Additionally, the apparatus includes means for determining whether an assignment of a RS channel to the UE is performed by the network entity. Still further, the apparatus includes means for incrementing a counter value when the network entity fails to assign the RS channel. The apparatus also includes means for selecting another network entity when the counter value reaches a predetermined threshold.

Also, a computer-readable media is offered that may include machine-executable code for receiving a synchronization channel message parameter at a UE from a network entity. The code may be executable for transmitting data to the network entity based on the synchronization channel message parameter. Additionally, the code may be executable for determining whether an assignment of a RS channel to the UE is performed by the network entity. Still further, the code may be executable for incrementing a counter value when the network entity fails to assign the RS channel. The code may also be executable for selecting another network entity when the counter value reaches a predetermined threshold.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, structures and components are shown in block diagram form to avoid obscuring such concepts.

As discussed above, certain category of M2M devices require vast amount of data to be transmitted from one mobile device to the NW. In the absence of a RS channel assignment from a NW, the mobile device may continue to transmit the data on reverse fundicated traffic channel for long duration. For a mobile device that latches on to a BS that doesn't assign the RS channel to the mobile device, fast data rate transfer on RS channel would be impossible for that mobile device. Consequently, this type of wireless communication system architecture would be very ineffective when the mobile device needs to transmit large amount of data to the NW since the M2M device ends up residing in a traffic state for an extended duration of time. Thus, apparatuses and methods are provided for transmitting vast amount of data from a mobile device to a network at a fast data transfer rate.

Figure 1:
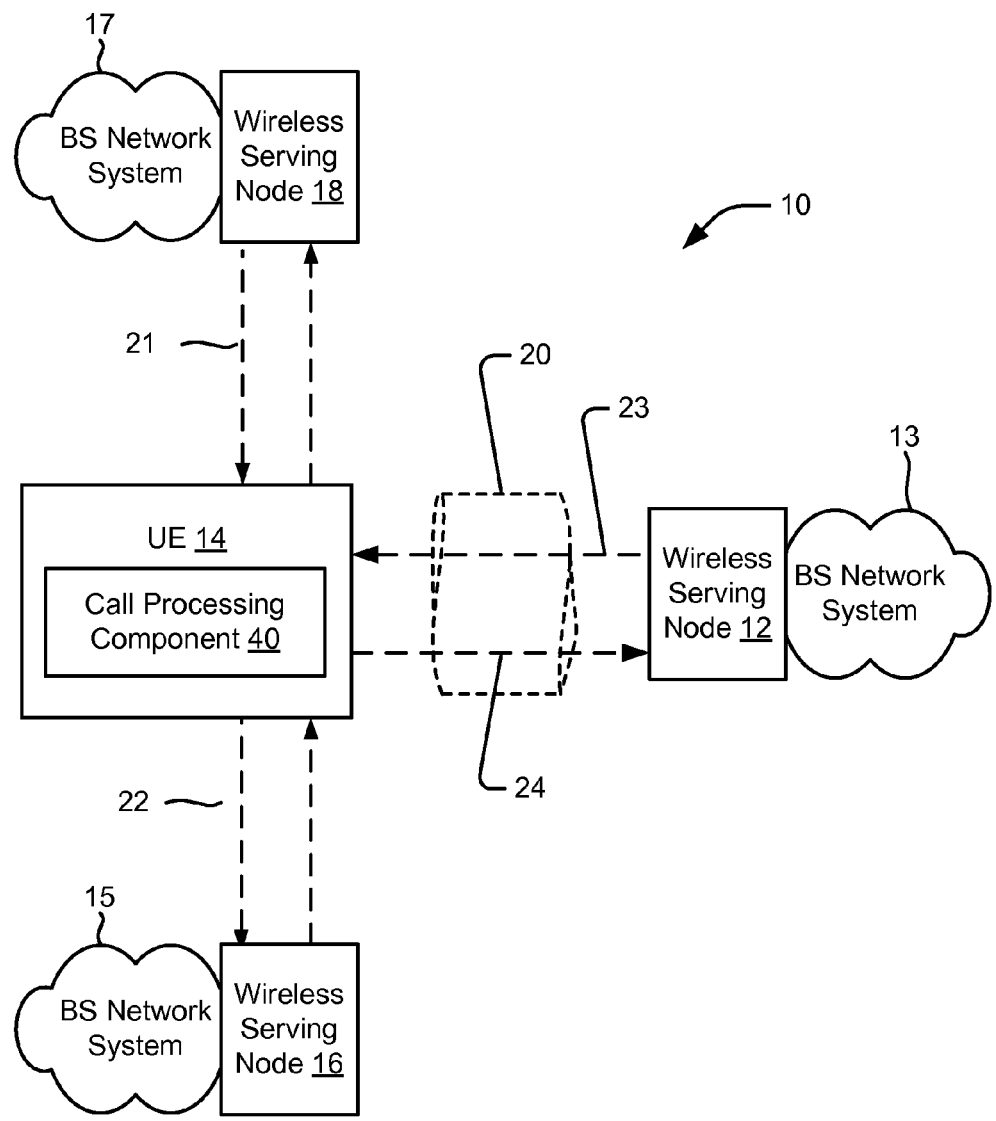
FIG. 1 is a block diagram illustrating an example wireless system according to some embodiments.

Referring to FIG. 1, in one aspect, a wireless communication system 10 is configured to facilitate transmitting vast amount of data from a mobile device to a network at a fast data transfer rate. Wireless communication system 10 includes at least one UE 14 that may communicate wirelessly with one or more BS network system 13, 15, or 17 via serving nodes, including, but not limited to, wireless serving node 12, 16, or 18, via one or more wireless link 20, 21, or 22, respectively. The one or more wireless link 20, 21, or 22 may include, but are not limited to, signaling radio bearers and/or data radio bearers. Wireless serving node 12 may be configured to transmit one or more signals 23 to UE 14 over the one or more wireless link 20, and/or UE 14 may transmit one or more signals 24 to wireless serving node 12. In an aspect, signal 23 and signal 24 may include, but are not limited to, one or more messages, such as a synchronization channel (SCH) message, transmitted from the wireless serving node 12 to the UE 14.

In an aspect, UE 14 may include a call processing component 40, which may be configured to transmit data to wireless serving node 12, for example, based on an a SCH message parameters received from the wireless serving node, such as a message type. Specifically, in an aspect, call processing component 40 of UE 14, may be configured to receive a SCH message, transmit data to wireless serving node 12 based on the SCH message, determine the assignment of a RS channel, increment a counter, and select another BS network system 15 or 17/wireless serving node 16 or 18 when the counter reaches a predetermined value. As such, the operation of call processing component 40 of UE 14 may be capable of transmitting vast amount of data from a mobile device to a network at a fast and efficient data transfer rate.

UE 14 may comprise a mobile apparatus and may be referred to as such throughout the present disclosure. Such a mobile apparatus or UE 14 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 12 of wireless communication system 10, may include one or more of any type of network component, such as an access point, including a BS or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small base stations, such as, but not limited to a femtocell, picocell, microcell, or any other small base station.

Figure 2:
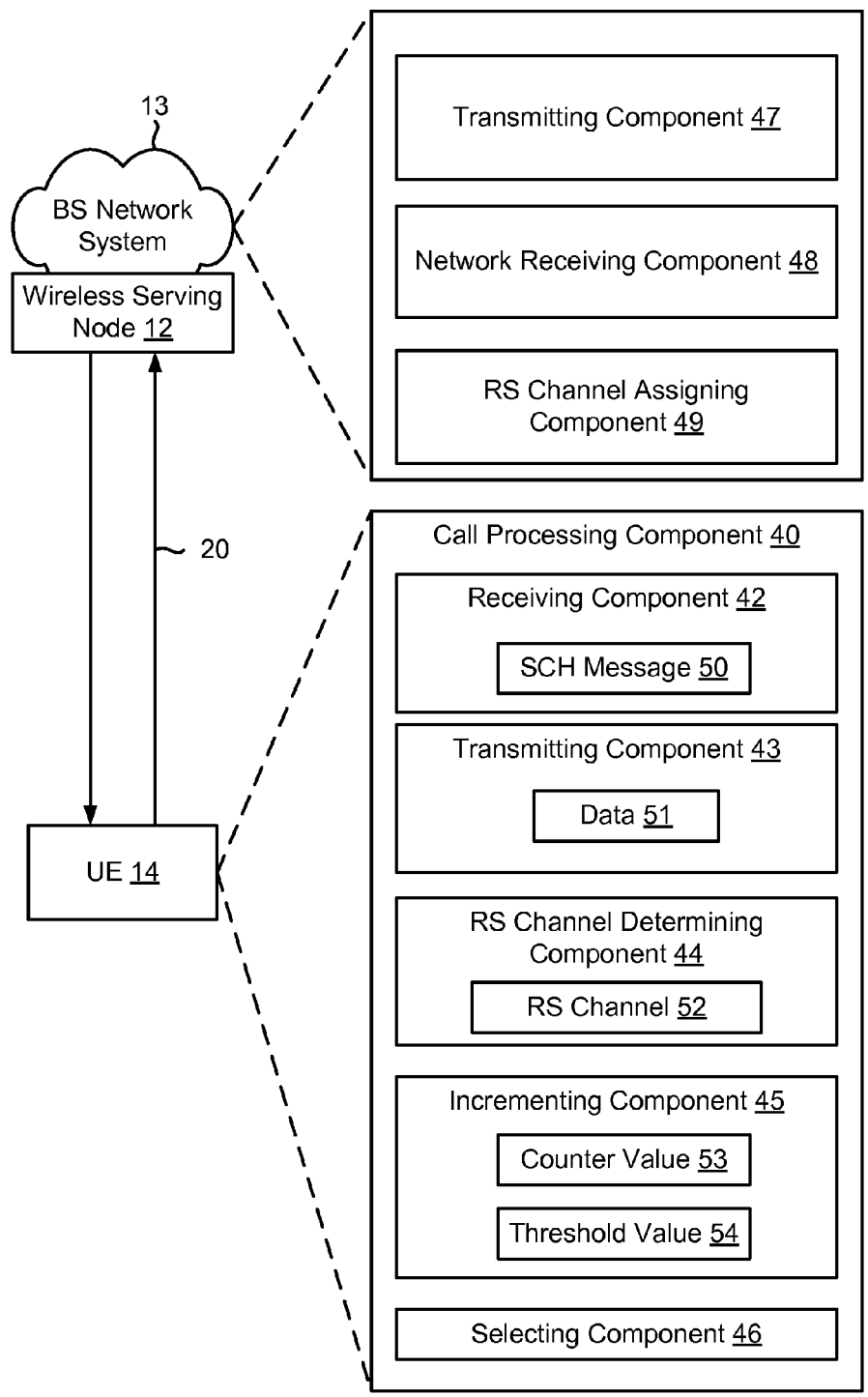
FIG. 2 is a schematic diagram illustrating exemplary aspect of call processing in a wireless communication system according to some embodiments.

Referring to FIG. 2, in an aspect, a wireless communication system 10 includes a UE 14 having a call processing component 40 configured to facilitate transmitting vast amount of data from a mobile device to a network, and vice versa. The wireless communication system 10 may be configured to support communications between a number of users, and FIG. 2 illustrates a manner in which wireless serving node 12, located in BS network system 13, communicates with UE 14. The wireless communication system 10 can be configured for downlink message transmission or uplink message transmission over wireless link 20, as represented by the up/down arrows between BS network system 13/wireless serving node 12 and UE 14.

In an aspect, the BS network system 13 may be configured to transmit a SCH message 51 to the UE 14, receive data 51 from the UE 14, and assign a RS channel 52 to the UE 14. For instance, the BS network system 13 may be configured to include a transmitting component 47 configured to transmit an SCH message 51 to the UE 14. Indeed, the BS network System 13 may be configured to transmit the SCH message 50 to the UE 14 via wireless serving node 12 over wireless link 20. Additionally, the transmitting component 47 of BS network system 13 may be configured to transmit a protocol revision (PREV) 53 to the UE 14.

In another aspect, upon transmitting the SCH message to the UE 14, the BS network system 13 may be configured to include a network receiving component 48 configured to receive data 51 from the UE 14. For example, the BS network system 13 may be configured to receive data 51 from the UE 14 via wireless serving node 12 over wireless link 20 after transmitting the SCH message 50 to the UE 14. Note, the information associated with the data will be discussed below.

Still further, the BS network system 13 may be configured to include a RS channel assigning component 49 configured to assign the RS channel 52 to the UE 14. For example, the BS network system 13 may be configured to assign the RS channel 52 to the UE 14 after receiving data 51 from the UE 14 via wireless serving node 12 over wireless link 20.

In an aspect, within the UE 14 resides a call processing component 40. The call processing component 40 may be configured to receive a SCH message 50, transmit data 51 to wireless serving node 12 based on the SCH message 50, determine the assignment of a RS channel 52, increment a counter value 53, and select another BS network system 15 or 17 (FIG. 1) when the counter value 53 reaches a predetermined value. The call processing component of UE 14 may be configured, among other things, to include a receiving component 42 capable of receiving an SCH message 50 from wireless serving node 12 over wireless link 20.

The SCH message 50 may be associated with one or more parameters that support faster data transmission which may include, but are not limited to, signal-to-noise ratio, channel throughput, channel quality, and/or other parameters that includes data information to be transferred from wireless serving node 12 to UE 14, and synchronization information that synchronizes that data transfer from wireless serving node 12 and UE 14. For example, a SCH message 50 may include parameter values computed based on inherent characteristics for the serving channel, such as, but not limited to retry rate, packet error rate (PER), access delay, retransmission or acknowledgement message (RTS/ACK) error rate, etc. In other words, the receiving component 42 may be configured to receive a SCH message 50 from the wireless serving node 12 over wireless link 20, which may determine the synchronization between wireless serving node 12 and UE 14 based on the parameter values associated with the received SCH message 50.

The call processing component of UE 14 may be configured to include a transmitting component 43 configured to transmit data 51 to wireless serving node 12. The data 51 may be based on the SCH message 50 received by the receiving component 42. For example, data 51 may be associated with information that is required to be sent to BS network system 13 via wireless serving node 12 over wireless link 20, which may include packet data transmitted as bytes, characters, or bits, as well as payload data, user data, control information, etc. Data 51 may also include information or instruction as to data rate transfer between UE 14 and wireless serving node 12. In other words, transmitting component 43 may be configured to transmit data 51 from UE 14 to wireless serving node 12 on a channel over wireless link 20 based on the SCH message 50 received by the receiving component 42.

In an aspect, the call processing component of UE 14 may be configured to include a RS channel determining component 44 capable of determining whether an assignment of a RS channel 52 to the UE is performed by the wireless serving node 12. Generally, as stated above, data 51 is transmitted to the wireless serving node 12 from the UE 14 over wireless link 20 on a fundicated channel. However, as this type of data transfer occurs over an extended period of time, the power requirements for the UE 14 become significant, which may lead to UE 14 shutdown. Typically, the fundicated channel supports up to 9.8 Kbps while the RS channel supports 200 Kbps.

As such, in an aspect, the wireless serving node 12 provides an assignment of a RS channel 52 to the UE 14 such that data 51 may be transmitted on the RS channel 52 from the UE 14 to the wireless serving node 12 at a high or fast data transfer rate (e.g., at rates ranging from about 70 Kpbs to about 300 Kpbs). In other words, RS channel determining component 44 may be configured to determine that a RS channel 52 has been assigned to the UE 14 by the wireless serving node 12 such that data 51 is transmitted by the transmitting component 43 over wireless link 20 from the UE 14 to the wireless serving node 12 on the assigned RS channel 52.

In some scenarios, the BS network system 13 may not assign a RS channel to UE 14 if the BS network system 13 does not currently support SCH with the UE 14. For example, if the BS network system 13 is overloaded with SCH transmissions with other UEs, if the UE 14 is attempting to access the BS network system 13 during peak times, or other occasions where the UE 14 is unable to access the BS network system 13. The UE 14 can be configured to monitor these non-assignments. The call processing component of UE 14 may be configured to include an incrementing component 45 for incrementing a counter value 53 when the determination is made that wireless serving node 12 has failed to assign a RS channel 52 to the UE 14. For example, after completing transmitting data 51 from the UE 14 to the wireless serving node 12, the RS channel determining component 44 determines if a RS channel 52 has been assigned to the UE 14 by the wireless serving node 12.

If a RS channel 52 has not been assigned to the UE 14 by the wireless serving node 12, the value of the counter value 53 is incremented by one. Thereafter, for each completed transmission of data 51 to wireless serving node 12 from the UE 14 over wireless link 20, when the RS channel determining component 44 determines if a RS channel 52 has not been assigned to the UE 14, the value of the counter value 53 is incremented by one until a predetermined threshold value 54 is reached. The predetermined threshold value 54 may be tunable or adjusted by BS network system 13 or the UE 14.

Upon reaching the predetermined threshold value 54, the selecting component 46 may be configured to select another wireless serving node, such as wireless serving node 16 or 18 (FIG. 1) that serves BS network system 15 or 17, respectively, that is capable of assigning a RS channel to the UE 14. In other words, the call processing component 40 is configured to include a selecting component 46 that may be capable of selecting to connect to BS network system 15 or 17 via wireless serving node 16 or 18 over wireless link 21 or 22, respectively, when the counter value 53 is incremented by the incrementing component 45 to a predetermined threshold value 54. It should be noted that BS network system 15 and 17 may include equivalents to all the components residing and operating in the BS network system 13.

If, however, a RS channel 52 has been determined to be assigned to the UE 14 by the wireless serving node 12 at any point before the counter value 53 reaches the predetermined threshold value 54, the call processing component 40 initializes the counter value 53 to zero, and data 51 continues to be transmitted to the wireless serving node 12 from the UE 14.

According to some embodiments, a M2M device, in this case, UE 14, to communicate with a BS network system for a predetermined "N" number of calls if the BS network system does not assign a RS channel to the M2M device. Additionally, after the predetermined "N" number of calls is reached, the M2M is allowed to select a BS network system that does assign a RS channel to the M2M device. Accordingly, the M2M device no longer transmits data to a BS network system on a fundicated channel, which ends up consuming more power if the data to be transfer contains significant information. Instead, UE transmits data to a BS network system over a RS channel. This can increase data transfer rate and reduce power consumption of the M2M device.

Thus, as shown, UE 14 may include receiving component 42, transmitting component 43, RS channel determining component 44, incrementing component 45, expediting component 27, and selecting component 46 configured, for example, to carry out method(s) associated with those components, such as those discussed herein. Additional explanation of the operation of these various components will be provided below.

The components (also referred to herein as modules and/or means) of FIG. 2 may be, for example, hardware components specifically configured to carry out the stated processes/algorithm, software components implemented by a processor configured to perform the stated processes/algorithm, and/or software components stored within a computer-readable medium for implementation by a processor, or some combination.

Figure 3:
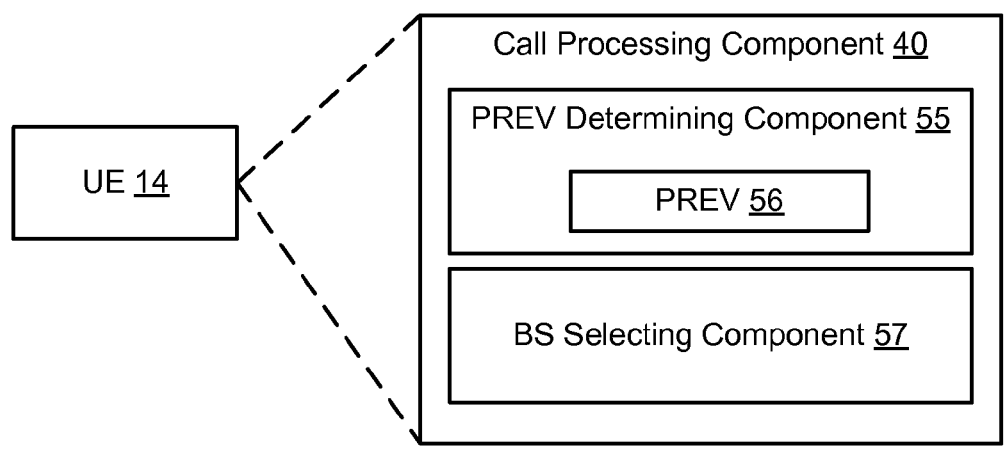
FIG. 3 is a schematic diagram illustrating another exemplary aspect of call processing in a wireless communication system according to some embodiments.

Referring to FIG. 3, in an aspect and in addition to the above described components, within the call processing component 40 of UE 14 resides a PREV determining component 55. This component can be configured to determine the PREV 56 of the BS network system 13. Upon determining the PREV 56 of the BS network system 13, the BS selecting component 57 may be configured to select a BS network system 15 or 17 if the BS network system 13 does not support RS channel or is not RS channel capable. For instance, if the PREV 56 of the BS network system 13 is less than the fifth revision (or a 95 A/B system), the BS selecting component 57 may select another BS network system, such as BS network system 15 or 17, since the fifth revision (or a 95 A/B system) is not RS channel or SCH capable.

In other words, PREV determining component 55, residing in UE 14, is configured to determine the PREV 56 of the BS network system 13 and based on the PREV 56 of BS network system 13, the BS selecting component 57, residing in UE 14, is configured to another BS network system that is RS channel or SCH capable.

The call processing component 40 may execute the PREV determining component 55 and the BS selecting component 57 prior, after, or in addition to executing the transmitting component 43, the RS channel determining component 44, the incrementing component 45, and the selecting component 46 described in FIG. 2. Thus, as shown, UE 14 may include PREV determining component 55 and BS selecting component 57 configured, for example, to carry out method(s) associated with those components, such as those discussed herein. Additional explanation of the operation of these various components will be provided below.

The components (also referred to herein as modules and/or means) of FIG. 3 may be, for example, hardware components specifically configured to carry out the stated processes/algorithm, software components implemented by a processor configured to perform the stated processes/algorithm, and/or software components stored within a computer-readable medium for implementation by a processor, or some combination.

Figure 4:
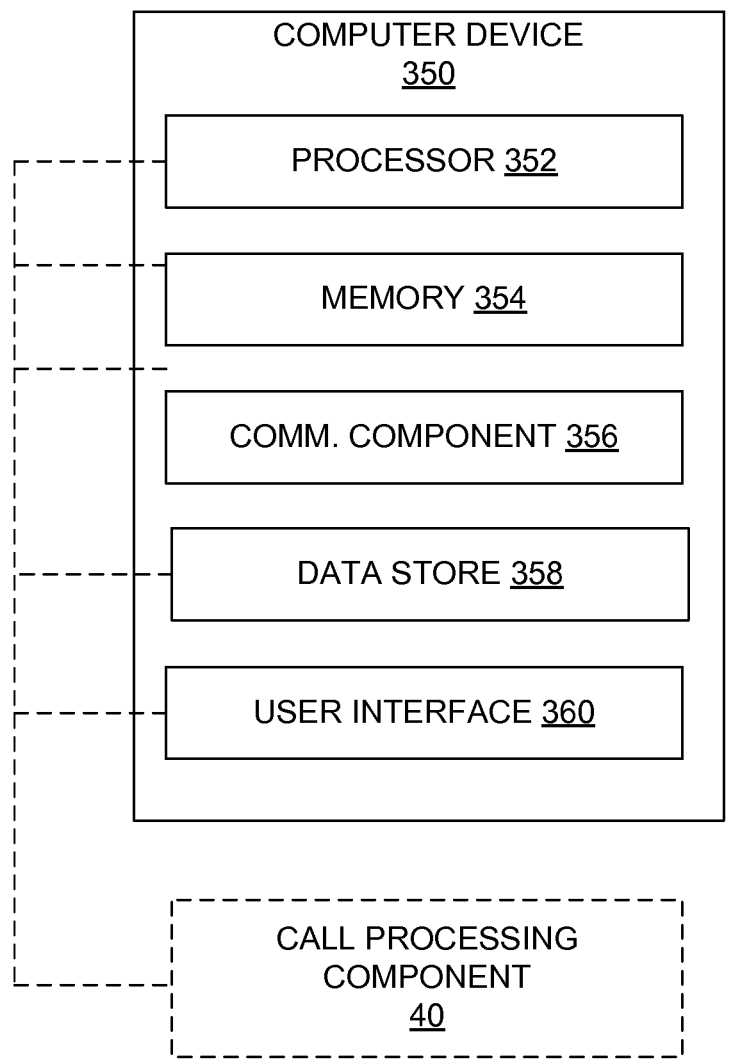
FIG. 4 is a block diagram illustrating additional example components of an aspect of a computer device having a call processing component according to some embodiments.

Referring to FIG. 4, in one aspect, UE 14 and/or wireless serving node 12 of FIGS. 1 and/or 2 may be represented by a specially programmed or configured computer device 350. The special programming or configuration can include call processing component 40, as described herein. For example, for implementation as UE 14 (FIGS. 1 and 2), computer device 350 may include one or more components for computing and transmitting a SCH message from a wireless serving node 12 to a UE 14 and assigning a RS channel to the UE 14, such as in specially programmed computer readable instructions or code, firmware, hardware, or some combination thereof. Computer device 350 includes a processor 352 for carrying out processing functions associated with one or more of components and functions described herein. Processor 352 can include a single or multiple set of processors or multi-core processors. Moreover, processor 352 can be implemented as an integrated processing system and/or a distributed processing system.

Computer device 350 further includes a memory 354. The memory can be used for storing data (e.g., instructions for processing) and/or local versions of applications being executed by processor 352. Memory 354 can include any type of memory usable by a computer, such as random access memory (RAM), read only memory (ROM), tapes, magnetic discs, optical discs, volatile memory, non-volatile memory, and any combination thereof.

The computer device 350 includes a communications component 356 that provides for establishing and maintaining communications with one or more parties utilizing hardware, software, and services as described herein. Communications component 356 may carry communications between components on computer device 350, as well as between computer device 350 and external devices, such as devices located across a communications network and/or devices serially or locally connected to computer device 350. For example, communications component 356 may include one or more buses, and may further include transmit chain components and receive chain components associated with a transmitter and receiver, respectively, or a transceiver, operable for interfacing with external devices. For example, in an aspect, a receiver of communications component 356 operates to receive one or more SCH messages from a wireless serving node 12, which may be a part of memory 354. Also, for example, in an aspect, a transmitter of communications component 356 operates to transmit data 51 to a BS network system 13 via a wireless serving node 12 over wireless link 20.

Additionally, computer device 350 may further include a data store 358. The data store can be any suitable combination of hardware and/or software, that provides for mass storage of information, databases, and programs employed in connection with aspects described herein. For example, data store 358 may be a data repository for applications not currently being executed by processor 352.

Computer device 350 may additionally include a user interface component 360 operable to receive inputs from a user of computer device 350, and further operable to generate outputs for presentation to the user. User interface component 360 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 360 may include one or more output devices, including but not limited to a display, a speaker, a haptic feedback mechanism, a printer, any other mechanism capable of presenting an output to a user, or any combination thereof.

Furthermore, computer device 350 may include, or may be in communication with, call processing component 40, which may be configured to perform the functions described herein.

Figure 5:
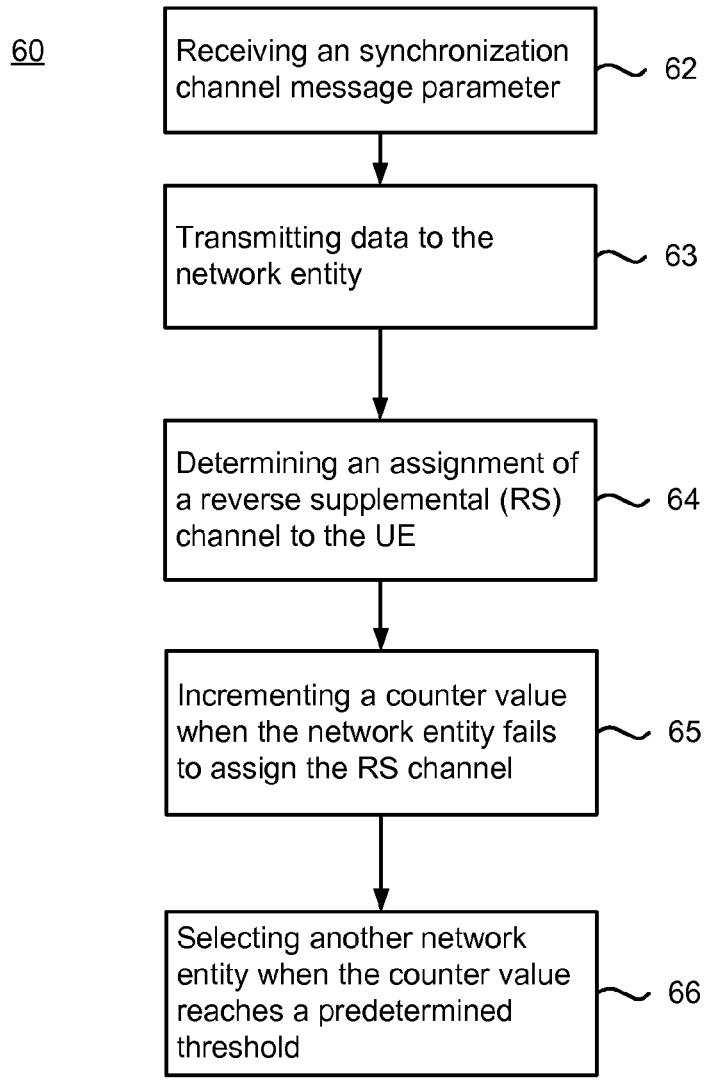
FIG. 5 is a flow diagram illustrating an exemplary method for call processing in a wireless communication system according to some embodiments.

FIG. 5 is a flow diagram illustrating an exemplary method 60. In an aspect, method 60 may be performed by a UE (e.g., UE 14 of FIGS. 1 and 2), and may be performed by a processor or other component capable of executing computer-executable instructions for performing the steps of FIG. 5. In some examples, method 60 may include a UE with a call processing component that may be configured to execute components for receiving a SCH message, transmitting data to a wireless serving node, determining the assignment of a RS channel, incrementing a counter, and selecting another wireless node when counter reaches a predetermined value.

At 62, the UE is configured to receive a SCH message parameter at a user equipment (UE) from a network entity. For example, the receiving component 42 may be configured to execute a instruction for receiving a SCH message 50 from the wireless serving node 12 over wireless link 20 (FIG. 2). Based on the parameter values associated with the received SCH message 50, the SCH message 50 may determine the synchronization between wireless serving node 12 and UE 14

At 63, the UE transmits data to the network entity based on the SCH message parameter. For example, the transmitting component 43 may be configured to execute instructions for transmitting data 51 from UE 14 to wireless serving node 12 over wireless link 20 based on the SCH message 50 received by the receiving component 42 (FIG. 2).

At 64, the UE 14 is configured to determine whether an assignment of a RS channel to the UE is performed by the network entity. For example, the RS channel determining component 44 may be configured to execute instructions for determining that a RS channel 52 has been assigned to the UE 14 by the wireless serving node 12 such that data 51 is transmitted by the transmitting component 43 from the UE 14 to the wireless serving node 12 on the assigned RS channel 52 (FIG. 2).

Afterwards, incrementing a counter value when the network entity fails to assign the RS channel occurs at 65. For example, an incrementing component 45 may be configured for executing instructions for incrementing a counter value 53 when the determination is made that wireless serving node 12 has failed to assign a RS channel 52 to the UE 14 (FIG. 2).

Last, at 66, the UE is configured to select another network entity when the counter value reaches a predetermined threshold. For example, a selecting component 46 may be configured for executing instructions for selecting to connect to BS network system 15 or 17 via wireless serving node 16 or 18 when the counter value 53 is incremented by the incrementing component 45 to a predetermined threshold value 54 (FIG. 2).

In an aspect, for example, the executing method 60 may be UE 14 or wireless serving node 12 (FIG. 1) executing the call processing component 40 (FIG. 1), or respective components thereof.

Figure 6:
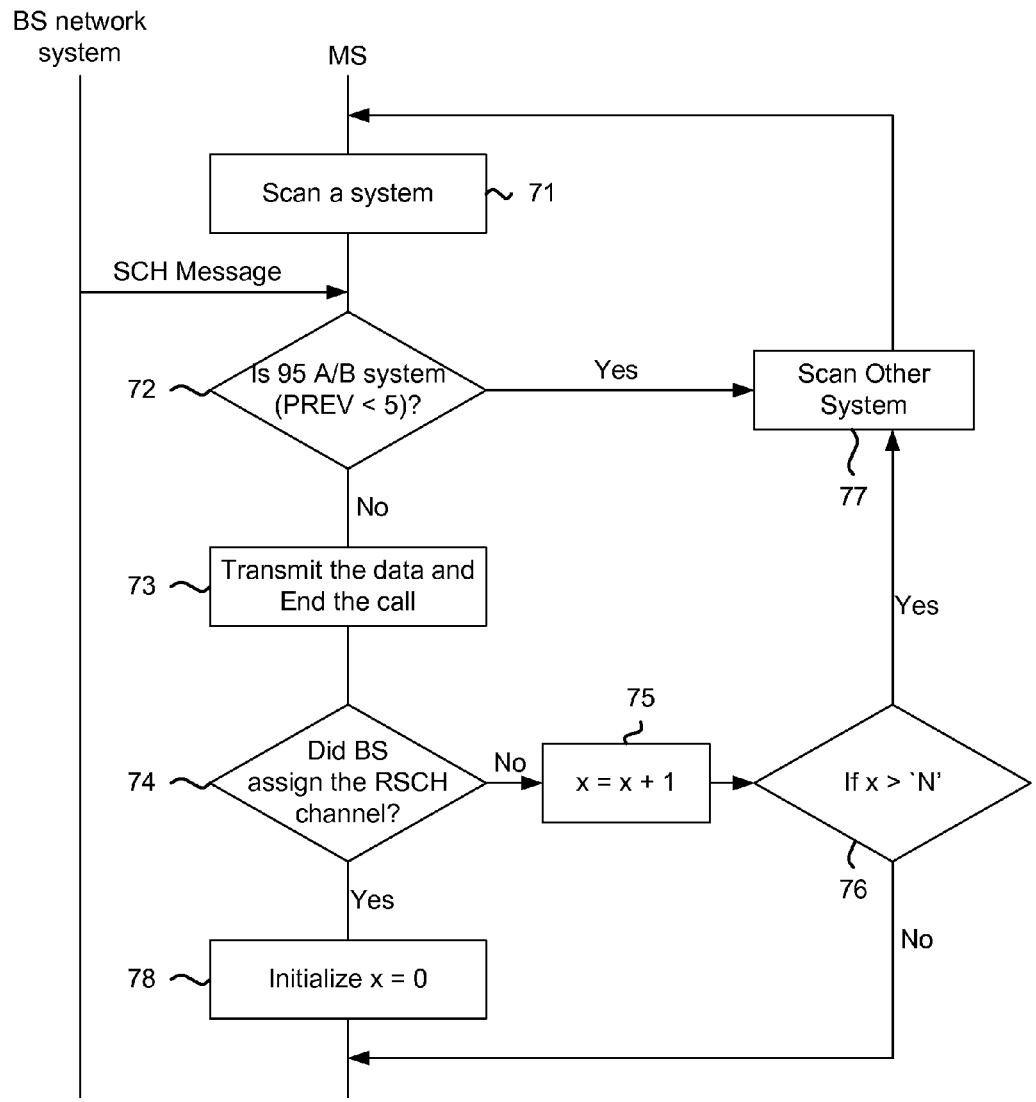
FIG. 6 is another flow diagram illustrating an exemplary method for call processing in a wireless communication system according to some embodiments.

FIG. 6 is flow diagram illustrating another exemplary method 70 for transmitting vast amount of data from a mobile device to a network. Specifically, method 70 illustrates how determining the PREV of a BS network system may be performed and utilized before determining and assignment of a RS channel to a UE. Determining the PREV of a BS network system may also be performed after determining and assignment of a RS channel to a UE.

At 71, the mobile station (MS) scans for a BS network system for wireless communication. Once the MS finds a BS network system, the BS network system transmits a SCH message to the MS. For example, UE 14 initially scans for a connection to the BS network system 13 and via the wireless serving node 12, a SCH message is transmitted to the UE 14 over wireless link 20 (FIG. 2).

At 72, a determination is made by the MS whether the BS network system utilizes PREV 5 or less (or is a 95 A/B system). For example, the PREV determining component 55 may be configured to execute instructions for determining the PREV 56 of the BS network system 13 (FIG. 3).

If the BS network utilizes PREV 5 or less (or is a 95 A/B system), then at 77, the MS scans for another BS network system. For example, based on the PREV 56 of BS network system 13, the BS selecting component 57 may be configured to execute instruction for selecting or scanning another BS network system that is RS channel or SCH capable (FIG. 3).

If the BS network does not utilize PREV 5 or less (or is a 95 A/B system), then at 73, the MS transmits data to the BS network system and ends the call. For example, the transmitting component 43, residing in UE 14, may be configured to execute instructions for transmitting data 51 from UE 14 to the BS network system 13 via the wireless serving node 12 based on the SCH message 50 received by the receiving component 42 (FIG. 2).

At 74, the MS determines whether the BS network system assigned a RS channel to the MS during the call. For example, the RS channel determining component 44, residing in UE 14, may be configured to execute instructions for determining that a RS channel 52 has been assigned to the UE 14 by the wireless serving node 12 such that data 51 is transmitted from the UE 14 to the BS network system 13 via the wireless serving node 12 on the assigned RS channel 52 (FIG. 2).

If the BS network does not assign a RS channel to the MS during the call, then at 75, a counter value is incremented by one. For example, the incrementing component 45, residing in UE 14, may be configured for executing instructions for incrementing a counter value 53 by one. Incrementing can occur when a determination is made that the BS network system 13 via wireless serving node 12 has failed to assign a RS channel 52 to the UE 14 (FIG. 2).

After incrementing the counter value at 75 by one, the MS determines if the counter value reaches a predetermined number "N" at 76. For example, the incrementing component 45, residing in UE 14, may be configured for executing instructions for incrementing a counter value 53 until a predetermined threshold value 54 is reached (FIG. 2).

If the predetermined number "N" is reached, then the MS scan for another BS network system at 77. For example, when the counter value 53 is incremented by the incrementing component 45 to a predetermined threshold value 54, the selecting component 46, residing in UE 14, may be configured to execute instructions for selecting to connect to BS network system 15 or 17 via wireless serving node 16 or 18 over wireless link 21 or 22, respectively (FIG. 2).

If the predetermined number "N" is not reached, then the MS continues to the next call. For example, if the counter value 53 is incremented by the incrementing component 45 but does not reach a predetermined threshold value 54, the UE 14 continues on to the next call with BS network system 13.

At 78, if the BS network assigns a RS channel to the MS during the call, the counter value is initialized to zero and the MS continues to the next call. For example, the incrementing component 45, residing in UE 14, may be configured for executing instructions for initialized the counter value 53 to zero, when the determination is made that BS network system 13 via wireless serving node 12 has assigned a RS channel 52 to the UE 14 (FIG. 2). Thereafter, the UE 14 continues on to the next call with BS network system 13.

Consequently, by following the steps in FIGS. 5-6, M2M devices that are configured to latch to a BS that supports a RS channel could transmit data around 30 times faster than the M2M devices configured to latch to a BS that does not support a RS channel. Indeed, some embodiments can save up-to 97% of the time taken to transmit the same data on a fundicated channel. Table 1 is provided that illustrate specific powers savings when a M2M device is configured to latch to a BS that supports a RS channel as compared to a M2M device is configured to latch to a BS that does not support a RS channel.

TABLE 1

| Size | Time taken by the existing M2M devices by not preferring the SCH enabled BS | Time taken by this proposed solution of preferring SCH enabled BS | Savings % |
|---|---|---|---|
| 5 MB | ~8.9 mins | ~0.3 mins | ~97 |
| 10 MB | ~17.8 mins | ~0.6 mins | ~97 |
| 20 MB | ~35.6 mins | ~1.1 mins | ~97 |
| 50 MB | ~88.9 mins | ~2.8 mins | ~97 |
| 100 MB | ~177.8 mins | ~5.7 mins | ~97 |

As can be seen from Table 1, the proposed method and apparatus could save up-to 97% of the time taken to transmit the data on a fundicated channel verses a RS channel, resulting in significant power savings. Moreover, even including a BS system reselection time of around one to two seconds for M2M devices that are configured to search for a BS that supports a RS channel, the power savings is still significant.

Figure 7:
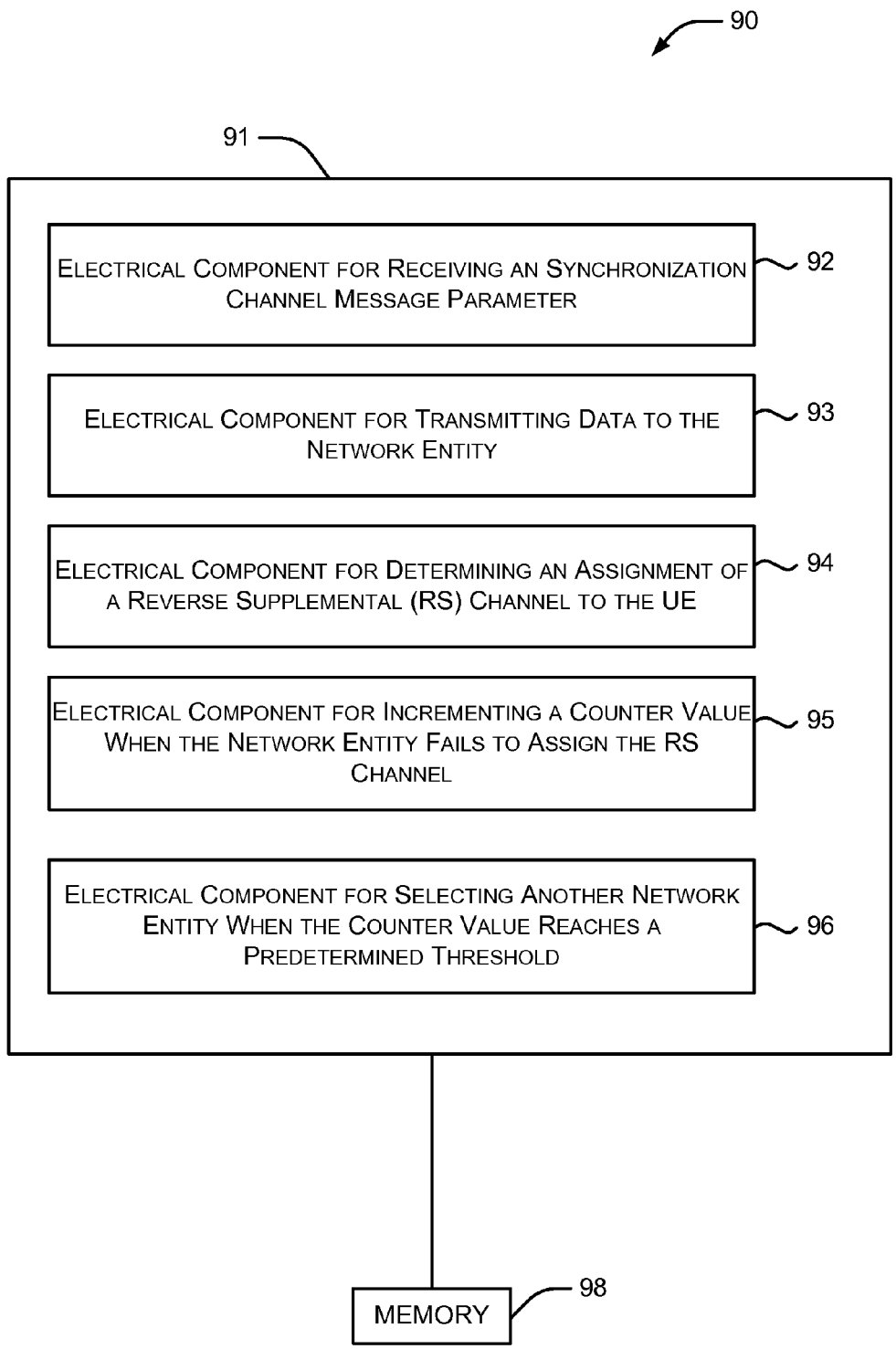
FIG. 7 is a component diagram illustrating aspects of a logical grouping of electrical components according to some embodiments.

Referring to FIG. 7, an example system 90 is displayed for transmitting vast amount of data from a mobile device to a network. System 90 can reside at least partially within UE 14 of FIGS. 1 and 2. It is to be appreciated that system 90 is represented as including functional blocks, which can be functional blocks that represent functions implemented by a processor, software, or combination thereof (e.g., firmware). For example, system 90 may be implemented via processor 352, memory 354, communications component 356, and data store 358 of FIG. 4, by for example, processor 352 executing software stored by memory 354 and/or data store 358.

Example system 90 includes a logical grouping 91 of electrical components that can act in conjunction. For instance, logical grouping 91 can include an electrical component 92 for receiving a synchronization channel message parameter. In an aspect, electrical component 92 may include receiving component 42 (FIG. 2).

Additionally, logical grouping 91 can include an electrical component 93 for transmitting data to the network entity. In an aspect, electrical component 93 may include transmitting component 43 (FIG. 2).

In an additional aspect, logical grouping 91 can include an electrical component 94 for determining an assignment of a RS channel to the UE 14. In an aspect, electrical component 94 may include RS channel determining component 44 (FIG. 2).

Logical grouping 91 can include an electrical component 95 for incrementing a counter value when the network entity fails to assign the RS channel. In an aspect, electrical component 94 may include incrementing component 45 (FIG. 2).

Logical grouping 91 can also include an electrical component 96 for selecting another network entity when the counter value reaches a predetermined threshold. In an aspect, electrical component 94 may include selecting component 46 (FIG. 2).

Electrical components 92-96 may correspond to one or more components in FIG. 2, and such components may be separate physical components, components implemented by processor 352 (FIG. 4), or a combination thereof.

Additionally, system 90 can include a memory 98 that retains instructions for executing functions associated with the electrical components 92-96, stores data used or obtained by the electrical components 92-96, etc. While shown as being external to memory 98, it is to be understood that one or more of the electrical components 92-96 can exist within memory 98. In one example, electrical components 92-96 can comprise at least one processor, or each electrical component 92-96 can be a corresponding module of at least one processor. Moreover, in an additional or alternative example, electrical components 92-96 can be a computer program product including a computer readable medium, where each electrical component 92-96 can be corresponding code.

Figure 8:
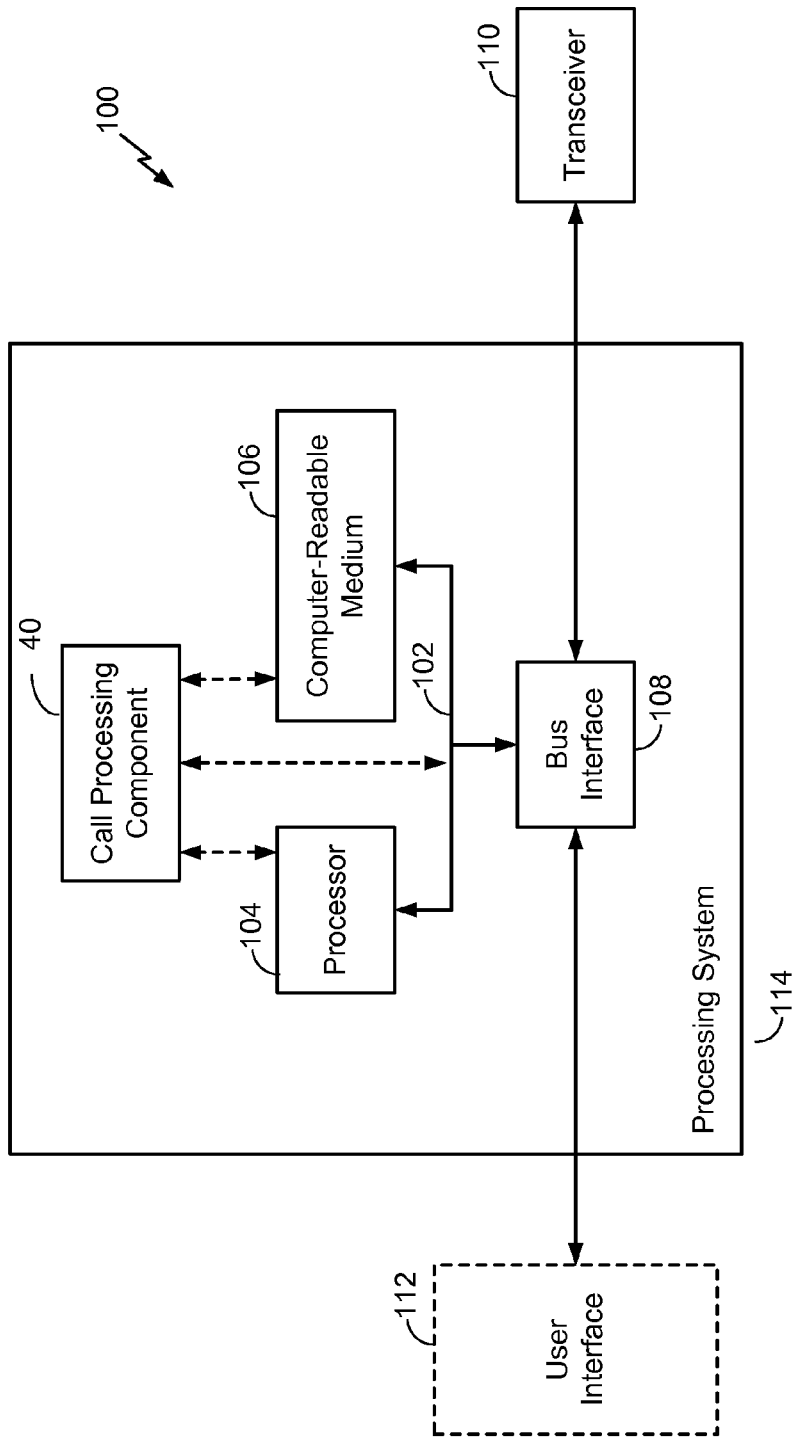
FIG. 8 is a block diagram illustrating an example of a hardware implementation for an apparatus employing a processing system according to some embodiments.

FIG. 8 is a block diagram illustrating an example of a hardware implementation for an apparatus 100 employing a processing system 114 for transmitting vast amount of data from a mobile device to a network. Apparatus 100 may be configured to include, for example, UE 14 (FIG. 1) and/or call processing component 40 (FIG. 1) implementing the components as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In an aspect, processor 104, computer-readable medium 106, or a combination of both may be configured or otherwise specially programmed to perform the functionality of the call processing component 40 (FIG. 1) as described herein.

The various concepts presented throughout this disclosure may be implemented across a broad variety of telecommunication systems, network architectures, and communication standards.

Figure 9:
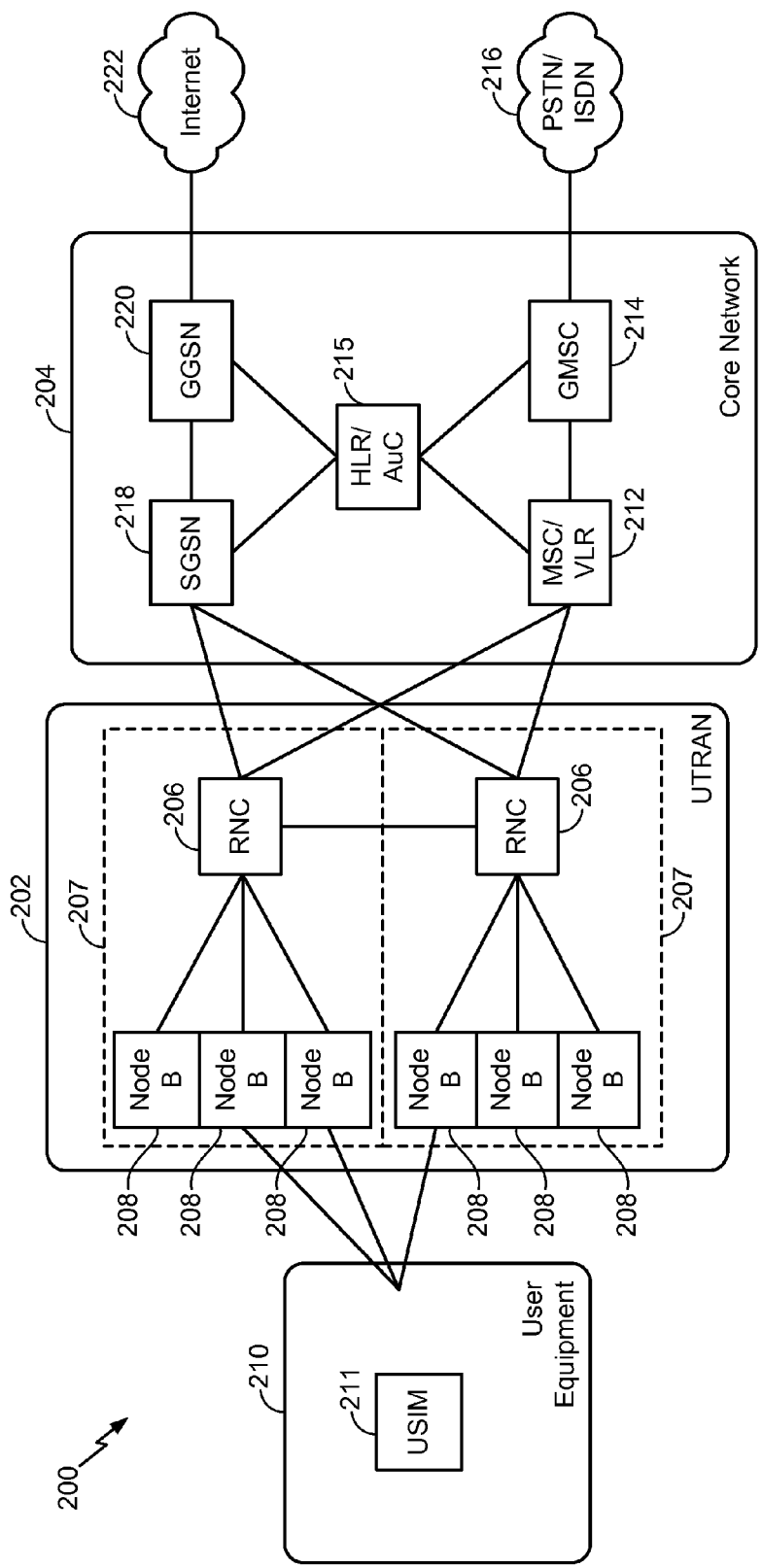
FIG. 9 is a block diagram conceptually illustrating an example of a telecommunications system including a UE according to some embodiments.

Referring to FIG. 9, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, the call processing component 40 (FIG. 1) as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, television, computing device, entertainment device, or any other similar functioning device. The UE 210 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 10:
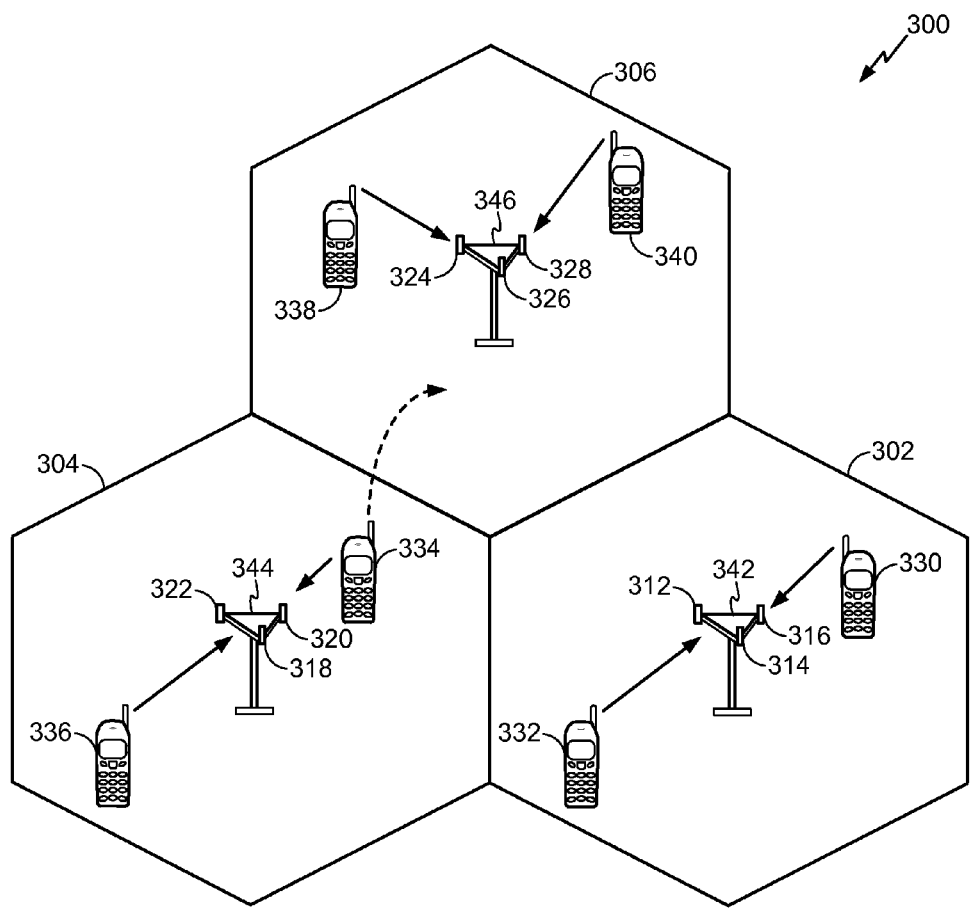
FIG. 10 is a conceptual diagram illustrating an example of an access network for use with a UE according to some embodiments.

Referring to FIG. 10, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 9) for all the UEs 330, 332, 334, 336, 338, 340 in the respective cells 302, 304, and 306. Node Bs 342, 344, 346 and UEs 330, 332, 334, 336, 338, 340 respectively may be configured to include, for example, the call processing component 40 (FIG. 1) as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 11.

Figure 11:
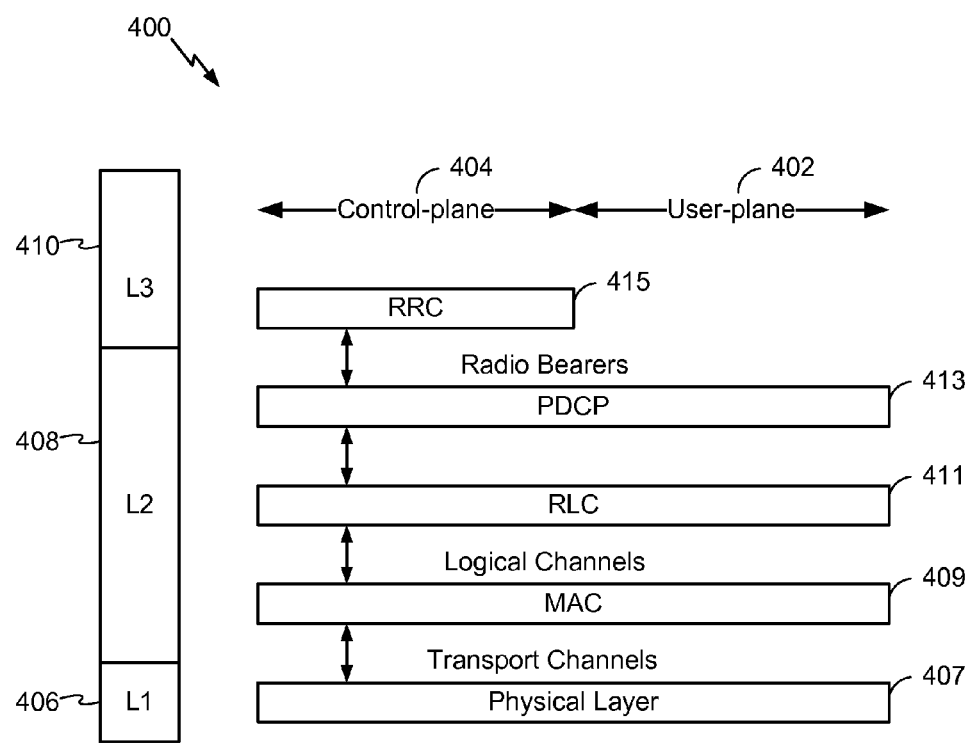
FIG. 11 is a conceptual diagram illustrating an example of a radio protocol architecture for the user and control planes for a base station and/or a UE according to some embodiments.

FIG. 11 is a conceptual diagram illustrating an example of the radio protocol architecture 400 for the user plane 402 and the control plane 404 of a user equipment (UE) or node B/base station. For example, architecture 400 may be included in a network entity and/or UE such as an entity within BS network system 13 and/or UE 14 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 12:
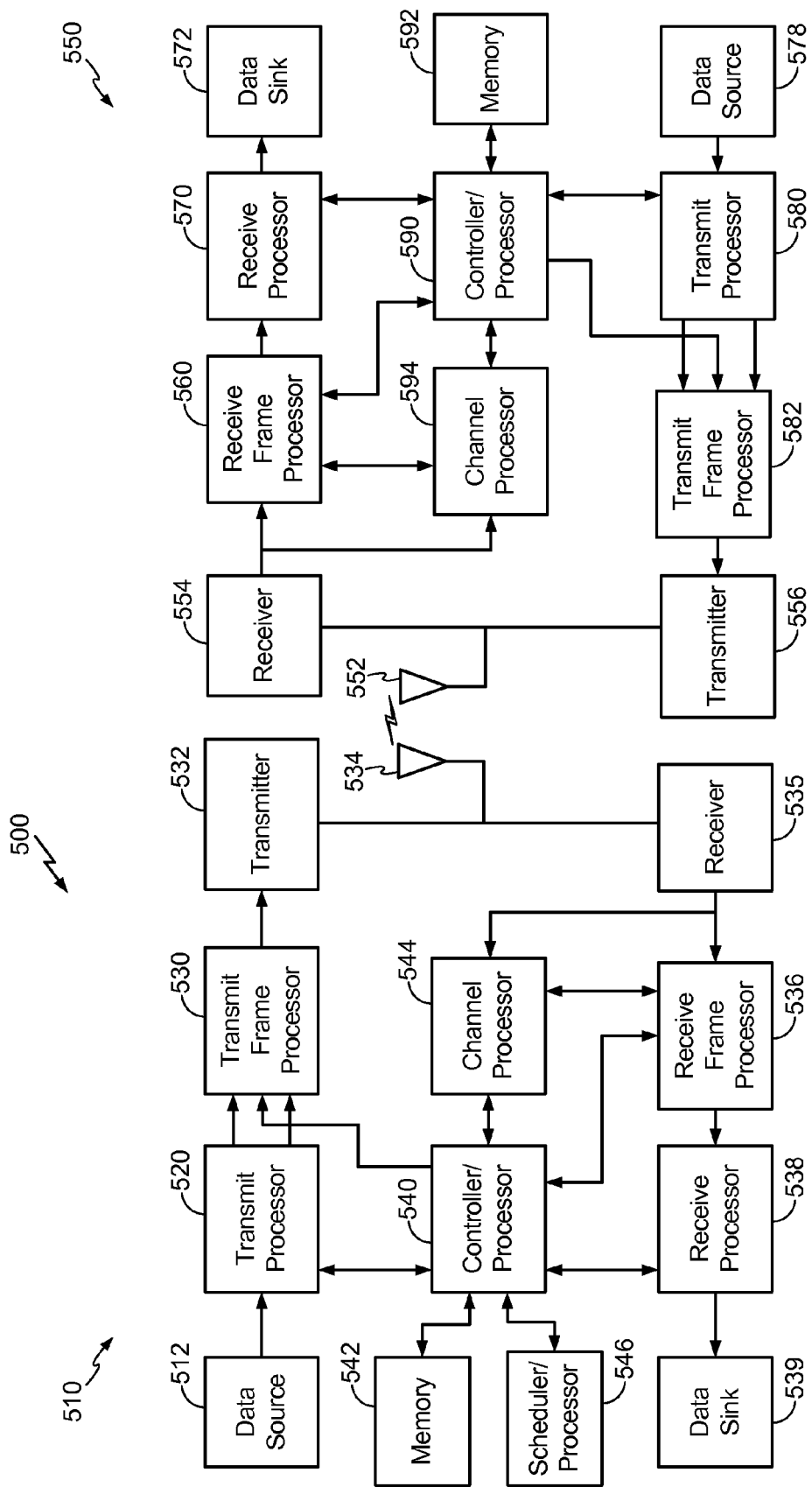
FIG. 12 is a block diagram conceptually illustrating an example of a Node B in communication with a UE in a telecommunications system according to some embodiments.

FIG. 12 is a block diagram of a communication system 500 including a Node B 510 in communication with a UE 550, where Node B 510 may be an entity within BS network system 13 and the UE 550 may be UE 14 according to the aspect described in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIGS. 4 and 8) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106 (FIG. 3). The computer-readable medium 106 (FIG. 3) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a synchronization channel message parameter at a user equipment (UE) from a network entity;
   transmitting data to the network entity based on the synchronization channel message parameter;
   determining whether an assignment of a reverse supplemental (RS) channel to the UE is performed by the network entity;
   incrementing a counter value based at least in part on determining that the assignment of the RS channel to the UE is not performed by the network entity; and selecting another network entity based at least in part on determining that the counter value reaches a threshold.

2. The method of claim 1, further comprising:
initializing the counter value to zero when the network entity performs the assignment of the RS channel to the UE.

3. The method of claim 1, further comprising:
determining a protocol revision (PREV) of the network entity; and
selecting another network entity based at least in part on determining the network entity is not RS channel capable based on the PREV.

4. The method claim 1, wherein the RS channel transmits data to the network entity at a rate ranging from about 70 kpbs to about 300 kpbs.

5. The method of claim 1, wherein the threshold is tunable by the UE.

6. The method of claim 1, wherein the threshold is tunable by the network entity.

7. The method of claim 1, further comprising:
discontinuing transmitting data to the network entity when the counter value reaches the threshold.

8. The method of claim 1, wherein the another network entity supports assignment of a RS channel to the UE.

9. An apparatus for wireless communication, comprising:
at least one processor; and
a memory coupled to the at least one processor, wherein the at least one processor is configured to:
receive a synchronization channel message parameter at a UE from a network entity;
transmit data to the network entity based on the synchronization channel message parameter;
determine whether an assignment of a RS channel to the UE is performed by the network entity;
increment a counter value based at least in part on determining that the assignment of the RS channel to the UE is not performed by the network entity; and
select another network entity based at least in part on determining that the counter value reaches a threshold.

10. The apparatus of claim 9, wherein:
the at least one processor is further configured to:
initialize the counter value to zero when the network entity performs the assignment of the RS channel to the UE.

11. The apparatus of claim 9, wherein:
the at least one processor is further configured to:
determine a protocol revision (PREV) of the network entity; and
select another network entity based at least in part on determining the network entity is not RS channel capable based on the PREV.

12. The apparatus claim 9, wherein the RS channel transmits data to the network entity at rate ranging from about 70 kpbs to about 300 kpbs.

13. The apparatus of claim 9, wherein the threshold is tunable by the UE.

14. The apparatus of claim 9, wherein the threshold is tunable by the network entity.

15. The apparatus of claim 9, wherein:
the at least one processor is further configured to:
discontinue transmitting data to the network entity when the counter value reaches the threshold.

16. The apparatus of claim 9, wherein the another network entity supports assignment of a RS channel to the UE.

17. An apparatus for of wireless communication, comprising:
means for receiving a synchronization channel message parameter at a UE from a network entity;
means for transmitting data to the network entity based on the synchronization channel message parameter;
means for determining whether an assignment of a RS channel to the UE is performed by the network entity;
means for incrementing a counter value based at least in part on determining that the assignment of the RS channel to the UE is not performed by the network entity;
means for selecting another network entity based at least in part on determining that the counter value reaches a threshold.

18. The apparatus of claim 17, further comprising:
means for initializing the counter value to zero when the network entity performs the assignment of the RS channel to the UE.

19. The apparatus of claim 17, further comprising:
means for determining a protocol revision (PREV) of the network entity; and
means for selecting another network entity based at least in part on determining the network entity is not RS channel capable based on the PREV.

20. The apparatus of claim 17, wherein the threshold is tunable by the UE or the network entity.

21. The apparatus of claim 17, further comprising:
means for discontinuing transmitting data to the network entity when the counter value reaches the threshold.

22. A non-transitory computer-readable medium storing computer executable code for wireless communication, the code comprising:
code for receiving a synchronization channel message parameter at a UE from a network entity;
code for transmitting data to the network entity based on the synchronization channel message parameter;
code for determining whether an assignment of a RS channel to the UE is performed by the network entity;
code for incrementing a counter value based at least in part on determining that the assignment of the RS channel to the UE is not performed by when the network entity;
code for selecting another network entity based at least in part on determining that the counter value reaches a threshold.

23. The computer-readable medium of claim 22, wherein the code further comprises code for:
initializing the counter value to zero when the network entity performs the assignment of the RS channel to the UE.

24. The computer-readable medium of claim 22, wherein the code further comprises code for:
determining a protocol revision (PREV) of the network entity;
selecting another network entity based at least in part on determining of the network entity is not RS channel capable based on the PREV.

25. The computer-readable medium claim 22, wherein the code further comprises code for:
discontinuing transmitting data to the network entity when the counter value reaches the threshold.

* * * * *